United States Patent [19]

Hasebe et al.

[11] Patent Number: 5,049,370
[45] Date of Patent: Sep. 17, 1991

[54] PROCESS AND APPARATUS FOR PURIFYING ELEMENTAL SULFUR CARRIED IN AN AQUEOUS CAKE

[75] Inventors: Nobuyasu Hasebe, Palos Verdes; Jackson Yu, Irvine, both of Calif.

[73] Assignee: Ultraclean Incorporated, Irvine, Calif.

[21] Appl. No.: 412,890

[22] Filed: Sep. 26, 1989

[51] Int. Cl.$^5$ .................... C01B 17/033; C01B 17/05
[52] U.S. Cl. ............................ 423/578 R; 23/293 S; 423/576.2
[58] Field of Search ............... 23/293 S; 423/576.2, 423/578 R; 422/260, 262

[56] References Cited

U.S. PATENT DOCUMENTS 3,619,147  11/1971  Amano et al. .................... 422/262

FOREIGN PATENT DOCUMENTS 608143  9/1948  United Kingdom ............ 423/578 R
802384  10/1958  United Kingdom ............ 423/578 R
858056  1/1961  United Kingdom ............ 423/578 A
1420954  1/1976  United Kingdom ............ 423/578 R

*Primary Examiner*—Jeffrey E. Russel
*Attorney, Agent, or Firm*—Beehler & Pavitt

[57] ABSTRACT

A cake containing sulfur and other materials in a base solvent, such as that resulting from a liquid redox hydrogen sulfide removal process, is purified to obtain elemental sulfur by preferential solubilization of the sulfur, employing a selected solvent immiscible with the base solvent at an elevated temperature less than that required to produce a phase change. The base and selected solvents are then separated, and the temperature of the sulfur solvent is lowered to recrystalize elemental sulfur.

13 Claims, 3 Drawing Sheets

Fig. 3

SULFUR RECOVERY PROCESS MATERIAL BALANCE (lb/hr)

| MATERIAL | LINE NO. | | | | | |
|---|---|---|---|---|---|---|
| | 12 | 24 | 22 | 36 | 34 | 46 |
| SULFUR | 250.05 | 250.05 | 0.00 | 250.00 | 0.05 | 250.00 |
| WATER | 199.60 | 0.00 | 249.60 | 0.00 | 0.00 | 0.00 |
| ORGANIC COMP | 5.25 | 0.00 | 5.25 | 0.00 | 0.00 | 0.00 |
| $Na_2CO_3$ | 1.04 | 0.00 | 1.04 | 0.00 | 0.00 | 0.00 |
| FeS | 0.09 | 0.00 | 0.00 | 0.00 | 0.09 | 0.00 |
| SULFUR OXIDES | 1.97 | 0.00 | 1.97 | 0.00 | 0.00 | 0.00 |
| PCE | 0.00 | 2,500.50 | 0.00 | 2,500.00 | 0.50 | 2,500.00 |
| TOTAL | 458.00 | 2,750.64 | 257.86 | 2,750.00 | 0.64 | 2,750.00 |

| MATERIAL | LINE NO. | | | | | |
|---|---|---|---|---|---|---|
| | 52 | 68 | 54 | 62 | 74 | 14 |
| SULFUR | 0.00 | 0.00 | 250.00 | 250.00 | 0.00 | 0.00 |
| WATER | 50.00 | 25.00 | 25.00 | 0.00 | 25.00 | 50.00 |
| ORGANIC COMP | 0.00 | 0.00 | 0.00 | 0.00 | 0.00 | 0.00 |
| $Na_2CO_3$ | 0.00 | 0.00 | 0.00 | 0.00 | 0.00 | 0.00 |
| FeS | 0.00 | 0.00 | 0.00 | 0.00 | 0.00 | 0.00 |
| SULFUR OXIDES | 0.00 | 0.00 | 0.00 | 0.00 | 0.00 | 0.00 |
| PCE | 0.00 | 2,492.00 | 8.00 | 0.00 | 8.00 | 2,500.00 |
| TOTAL | 50.00 | 2,517.00 | 283.00 | 250.00 | 33.00 | 2,550.00 |

5,049,370

PROCESS AND APPARATUS FOR PURIFYING ELEMENTAL SULFUR CARRIED IN AN AQUEOUS CAKE

INTRODUCTION

Hydrogen sulfide is a common constituent of a wide variety of industrial gas streams. With the increasing restrictions imposed on the discharge of pollutants into the atmosphere, various processes have been developed and are employed to extract the hydrogen sulfide from such gas streams. One example is the well known amine absorption and Claus process. Another example is the Hiperion process of Ultrasystems Engineers and Constructors, Inc., Irvine, Calif., which is a single step liquid redox hydrogen sulfide removal process that uses a naphthoquinone chelate catalyst. As a third example, hydrogen sulfide may be extracted from a gas stream by absorption in an aqueous solution of a catalytic reagent containing vanadium compound or an iron chelate. Such processes effect oxidation of the hydrogen sulfide to solid, elemental sulfur, producing an aqueous cake that commonly includes trace amounts of the catalytic reagent as well as impurities from the gas stream. These processes generally are referred to as liquid redox processes.

The solid phase elemental sulfur which is produced by such processes normally exists in the form of an eight membered ring or other polymer which is substantially insoluble in water. This octet must be broken in order to accomplish dissolution of the sulfur.

The conventional method of purifying the aqueous sulfur cake is by heating it to melt the elemental sulfur, then separating the liquid sulfur from the contaminant-laden carrier phase. This method of sulfur purification is energy intensive; heat is required not only to provide the sensible heat but also to provide the latent heat required to achieve the phase change. Additionally, certain contaminants such as iron sulfide (which may be formed as a co-product with the sulfur and the hydrogen sulfide oxidation reaction) tend to remain in the sulfur phase.

The presence of trace amounts of the catalytic reagent in the extracted sulfur can give the resulting product an off cast or color or other unwanted characteristic, which in turn severely limits its marketability.

Thus, one object of the present invention is to purify cake-form elemental sulfur in an environmentally benign manner and without requiring the energy investment involved in the phase change process. Another object of the present invention is to achieve sulfur of sufficient purity that the resulting solid can be sold as a commodity-grade product. In general the resulting product will have the yellow color distinctive of pure sulfur. A further object is the production of commodity-grade sulfur through the use of separation techniques which utilize immiscible liquid phases. Another object is the use of separation techniques which employ sulfur. These and other objects of the invention will be apparent from the following description of preferred embodiments.

BRIEF SUMMARY OF THE INVENTION

The present invention provides both a process and an apparatus for purifying crude, solid phase elemental sulfur, such as in an aqueous cake. To extract the sulfur from the cake, an environmentally benign electrophilic organic solvent for elemental sulfur is employed. This organic solvent, which may be an admixture of compounds, is substantially immiscible in the base solvent of the cake—normally water—and is capable of dissolving at least approximately twice as much by weight of elemental sulfur at 100 degrees centigrade as at 20 degrees centigrade.

The solid sulfur cake in a base solvent is admixed with the organic solvent to form an admixture, the admixing being carried out at from approximately 10 and generally from 40 to 100 or higher degrees centigrade, but at a temperature below the boiling point of the admixture at the process pressure, to dissolve a substantial portion of the elemental sulfur in the organic solvent and to form a sulfur-laden solvent phase. The admixture is then allowed to stand to form a base solvent phase and a sulfur-laden organic solvent phase. If desired, other separation techniques such as centrifuging may be employed.

Next, the base solvent phase is separated from the sulfur-laden organic solvent phase. Under certain conditions the base solvent may be treated to remove solid impurities and other undesired materials and is then recycled. The sulfur-laden solvent phase may be treated to remove solid contaminants.

The sulfur-laden solvent phase is cooled to form elemental sulfur crystals and a sulfur saturated organic solvent. The sulfur saturated organic solvent is separated from the elemental sulfur crystals and recycled. If desired, the elemental sulfur crystals may be washed, such as with water, and dried to yield purified elemental sulfur. The sulfur saturated organic solvent may be recycled to the admixing step of the process.

The base solvent phase commonly will include ionic inorganic salts. It may be further processed, for example, to recover the alkalinity for reuse in the liquid redox process. Calcium oxide may be added, for example, to precipitate calcium sulfate.

In the interests of energy efficiency and environmental protection, the process of the present invention contemplates that the steps will be carried out in a continuous process at temperatures below the boiling points of the various liquids which are involved. The temperatures are maintained below the melting point of sulfur so that the energy required to effect a phase change in the elemental sulfur from solid to liquid is not expended. The base solvent and organic solvent phases are preferably recycled with the necessary purification and make-up procedures being applied as required. The waste streams are treated to render them environmentally inert before they are discharged from the process.

BRIEF DESCRIPTION OF THE DRAWINGS

The invention will be further described in connection with the accompanying drawings in which:

FIG. 3 is a table showing a typical material balance for the process and apparatus of the invention.

DETAILED DESCRIPTION OF A PREFERRED EMBODIMENT

The raw material for the present process is crude elemental solid phase sulfur. In this form, because of its off color and other contaminants the crude sulfur is of low value. It can be discharged but at a cost. Such crude sulfur is generally derived from the reduction of hydrogen sulfide which is itself a waste product that must be rendered environmentally inert before it can be discharged.

The first step in treating hydrogen sulfide is generally to convert it into solid phase crude sulfur. Numerous such procedures have been proposed. See, for example, U.S. Pat. Nos. 4,069,302, 4,592,905, 3,516,793, 4,765,969, 4,508,537, 3,095,275, and 4,730,369. The conversion processes are such that the solid phase sulfur is contaminated with various organic and inorganic impurities so that it is unusable for many commercial purposes. While the presently preferred embodiment of the invention assumes that the conversion process employs water as the base solvent media, to result in an aqueous cake, the invention is equally applicable to a variety of other base solvent media. It will be understood that the base solvent need not be water alone. For example, where very low ambient operating temperatures will be encountered it will be necessary to include well known freezing point depressants such as glycols and alcohols. If the ambient temperature is expected to be as low as −40 degrees centigrade a substantial quantity of methanol will generally be added to prevent freezing. If the lowest expected temperature is 0 degrees centigrade then ethylene glycol would be added to the water. It will be understood that the aqueous base solvent may include conventional additives.

Figure 1:
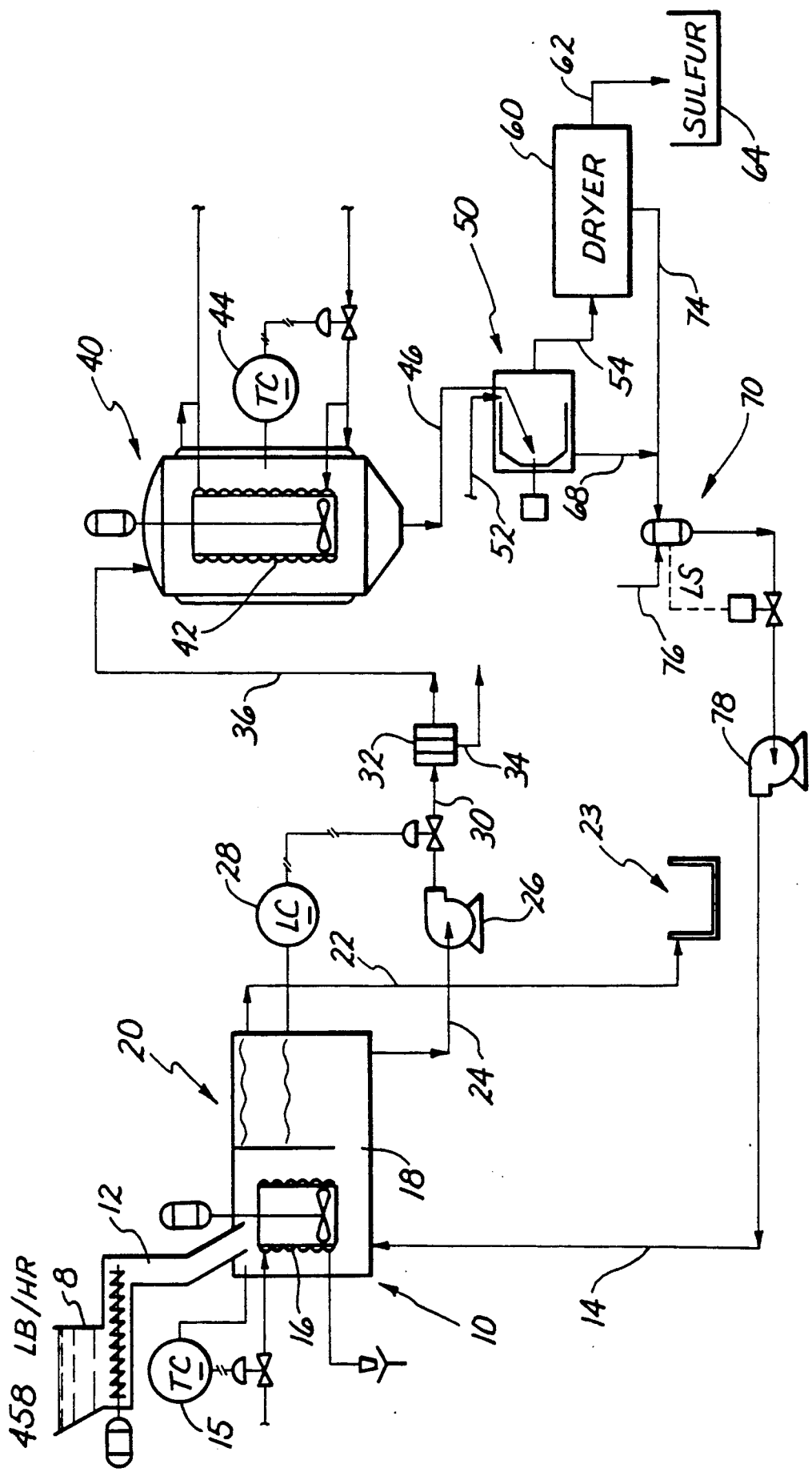
FIG. 1 is a schematic representation of a typical apparatus for carrying out a preferred process of the invention.

As shown in FIG. 1, the aqueous cake 8 laden with crude, solid phase elemental sulfur is supplied to a heated mixing vessel 10 through inlet 12. An appropriate solvent is supplied to inlet 14 of mixing vessel 10.

It is important to the success of the process to employ the correct solvent or combination of solvents. Although a number of solvents will dissolve sulfur preferentially, the preferred solvent employed in the present invention should be electrophilic, environmentally benign, readily available, and have physical and chemical characteristics which minimize the cost of operating the system. For an aqueous cake, the preferred solvent will be an organic solvent that is substantially water immiscible and is capable of dissolving at least approximately twice as much by weight of elemental sulfur at 100 degrees centigrade as at 20 degrees centigrade. The organic solvent, or combination of solvents should not form an emulsion with the base solvent. There should be no opportunity for the organic solvent and base solvent to combine to form a third layer. If an emulsion or a third layer is formed additional steps and reagents are generally required to break the emulsion or treat the third layer. The organic solvent must have a vapor pressure under the operating conditions of the process such that solvent losses through evaporation are minimized. Also, the cost of the compound must be such that the process can be operated economically. Halogenated hydrocarbons by themselves have been proposed for use in dissolving sulfur as has toluene. See, for example, U.S. Pat. Nos. 3,337,307 and 4,729,888.

As will be understood by those skilled in the art, several different organic solvents immiscible with the base solvent of the sulfur cake may be used according to the teachings of the present invention, including admixtures of organic solvents.

Figure 2:
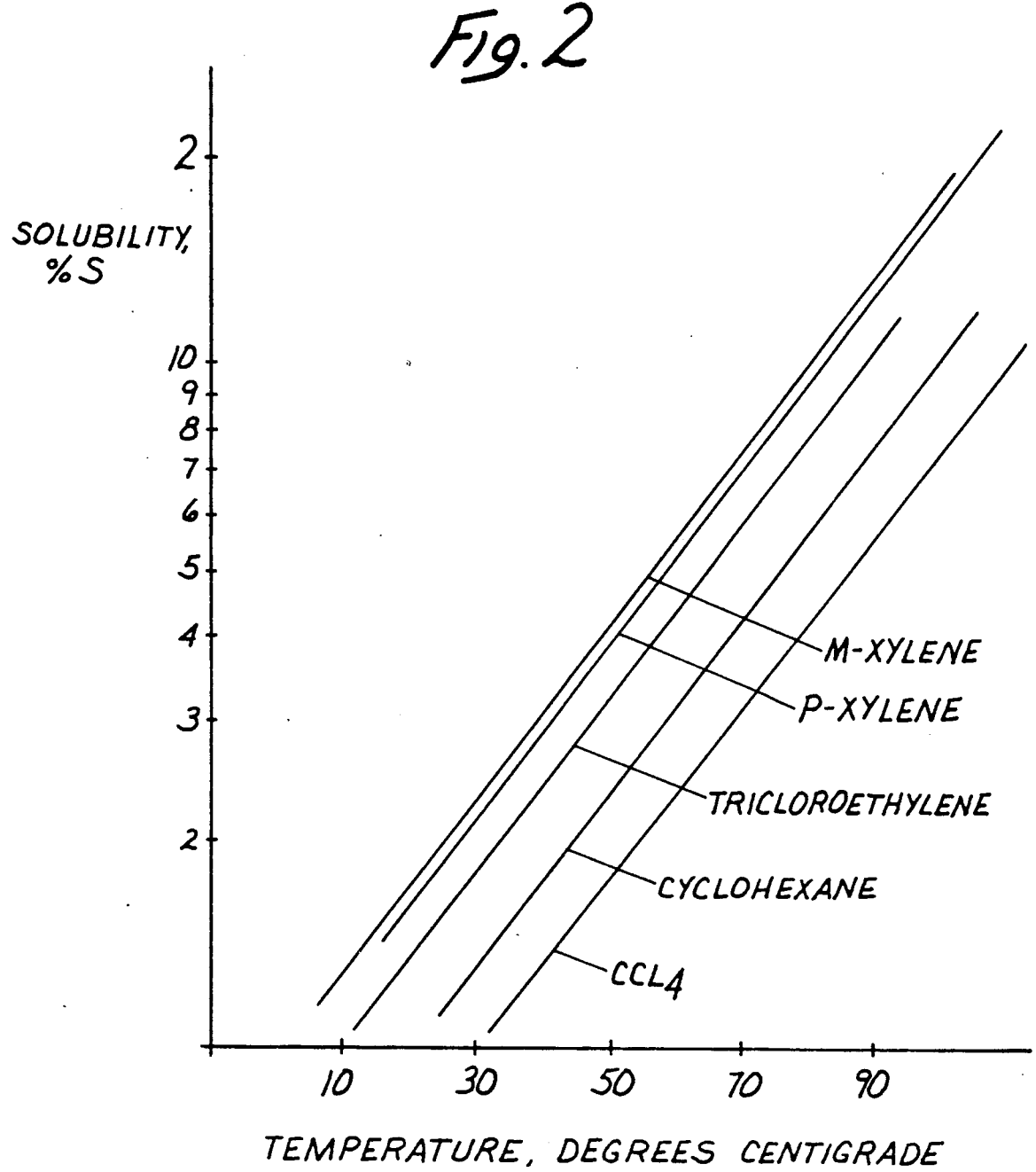
FIG. 2 is a graph showing preferential sulfur solubility for a selected number of solvents.

FIG. 2 illustrates a selected number of solvents having such preferential solubility for elemental sulfur. The vertical scale, which is logarithmic, expresses the solubility of sulfur as a percentage, while the horizontal scale is a linear display of temperature in degrees centigrade. The solvents included in FIG. 2 are provided for the purposes of illustration only and not limitation.

Among the solvents which can be satisfactorily employed in the present process where the base solvent is water are: xylenes, ethylbenzene, tetrahydronaphthalene, petroleum naptha, trichloroethylene, perchloroethylene (PCE), cyclohexane, ethyl cyclohexane, carbon tetrachloride, tetrachloroethane and mixtures thereof. The higher boiling solvents are preferred. These organic solvents are environmentally benign, readily available and have physical and chemical characteristics which minimize the cost of the process; they hold substantial quantities of dissolved sulfur at less than the boiling point of water. Chlorinated hydrocarbons are generally electrophilic and water immiscible. Certain chlorinated hydrocarbons have high boiling points and are considered to be environmentally benign. In general perchloroethylene is the preferred chlorinated hydrocarbon organic solvent.

There are other families of compounds which are electrophilic and therefore suitable for use in dissolving sulfur. These include amines, alcohols, glycols and aromatic hydrocarbons. Many of these compounds do not themselves have all of the other necessary characteristics, particularly immiscibility with the base solvent. It has been found that using admixtures of immiscible organic solvents with one or more of these other solvent compounds which do not have the necessary immiscibility characteristics will provide a substantial and unexpected improvement in results. The term "organic solvent" as used herein is intended to include all such organic solvents and solvent mixtures. In general the suitable amines include lower aliphatic substituted anilines, heterocyclic nitrogen ring compounds, lower alkyl amines, lower dialkyl amines, lower alkanol amines, aromatic amines, and the like. Examples of such amines include, for example, propylamine, amylamine, triaminobenzene, cyclohexylamine, pyridine, quinoline, ethanolamine, ethylenediamine, methylamine, ethylamine, butylamine, diethylamine, dimethylamine, diphenylamine, phenylenediamine, phenylethylamine, aniline, phenylaniline, ethylaniline, butylaniline, methylaniline and toluidine, and other primary, secondary, aliphatic, heterocyclic, and phenyl amines. Suitable alcohols include, for example, beta-naphthol and cellosolv. Suitable glycols include, for example, lower aliphatic glycols such as ethylene glycol, and diethyleneglycol.

Amines are particularly suitable for use with a perchloroethylene aqueous system because they generally dissolve selectively in the perchloroethylene phase rather than in the water phase. The solubility of the sulfur in the amine containing organic solvent phase is significantly higher than in, for example, perchloroethylene alone.

Some other compounds have been found to be effective in increasing the solubility of sulfur when added to perchloroethylene. For example, the nucleophilic compound, sulfolane, increases the solubility of sulfur in perchloroethylene.

In general, the solubility of sulfur in the organic solvent should be such that approximately 10 parts by weight will dissolve at least 0.5 and preferably 1 part or more by weight of crude sulfur at approximately 90 to 100 degrees centigrade. These organic solvents also hold substantially more dissolved sulfur when heated than when cooled. Dissolution of the crude sulfur and precipitation of purified sulfur can be accomplished by changing the temperature of the sulfur containing organic solvent. The process is operated through a temperature range of from approximately room temperature (and generally approximately 40 degrees centigrade) to just below the boiling point of the base solvent at the process pressure. The lower temperature is dictated by the capacity of the cooling system. Because of the presence of dissolved inorganic ionic species, the boiling point of the base solvent phase may be somewhat above 100 degrees centigrade. Pressure may be applied to the admixture if desired to elevate the boiling point.

In general, such organic solvents should hold at least approximately twice, and preferably four times, as much dissolved sulfur by weight at 100 degrees centigrade as at 20 degrees centigrade.

In the following description of a preferred process, perchlorethylene (PCE), is chosen as the organic solvent. PCE is immiscible with water, has a suitable sulfur solubility differential with temperatures below the boiling point of water, and is readily available, being commonly used as a drycleaning fluid. PCE can be easily used in commercial processes employing the present invention to produce sulfur having a purity in the 99 percent plus range.

Referring to FIG. 1, sufficient PCE is added to the mixing vessel 10 through line 14 to adequately solubilize the elemental sulfur contained in the aqueous cake supplied through inlet 12. The ratio of solvent to sulfur is determined by the solubility of the sulfur in the solvent. For PCE, a ratio of 10 to 1 is sufficient. The temperature of the mixture in vessel 10 is controlled by a temperature controller 15 which in turn governs the flow of heated liquid through coils 16 within vessel 10. Of course, heating coils 16 may be placed about the vessel as well, or in place of coils within the vessel, if desired.

Vessel 10 is of sufficient size to provide a total residence time for the heated aqueous cake—PCE admixture of approximately ten minutes. At an elevated and controlled temperature of about 90 degrees centigrade, and at atmospheric pressure, the sulfur in the cake gradually will enter into solution with the PCE solvent. This admixture is then transferred through opening or passage 18 to a settler vessel 20 which has a volume preferably approximately equal to that of mixing vessel 10. Since the solvent (PCE) is immiscible with water (which is assumed to be the liquid media or base solvent employed in the hydrogen sulfide redox process which resulted in the cake), these two liquid phases will gradually separate in vessel 20. The PCE solvent phase, laden with sulfur, has a higher density than water and therefore settles to the lower portion of vessel 20.

The upper, aqueous phase in vessel 20 will contain ionic inorganic dissolved salts, and is removed through line 22 to a collection basin vessel 23 for further treatment or disposal. For example, this phase may be further processed to recover the alkalinity for reuse in the liquid redox process, such as by the addition of compounds (e.g. calcium oxide) to precipitate such insoluble benign salts as calcium sulfate. Of course, other compounds will distribute between the two liquid phases according to their solubilities.

The sulfur laden solvent phase in vessel 20, which is still at an elevated temperature, is pumped from the vessel through line 24 by pump 26 at a rate governed by an interphase level controller 28 associated with vessel 20. Pump 26 discharges the solvent phase through line 30 to a filter 32 which removes insoluble solid compounds. These insoluble compounds are discharged from the filter through line 34, while the cleansed sulfur laden solvent phase is fed through line 36 to another vessel 40.

Vessel 40 is cooled, for example by a refrigerated liquid or cooling water being passed through coils 42 wrapped within the vessel, although again coils outside the vessel may be employed instead of or in addition to these internal coils. In this fashion, the temperature of the mother liquor within vessel 40 is reduced sufficiently—such as to 20 degrees centigrade—to crystalize and precipitate the sulfur out of solution with the solvent. Preferably the temperature of the mother liquor within vessel 40 is monitored and controlled to be held at the preferred value by a temperature controller 44.

The slurry cooled solvent laden with sulfur crystals resulting from the cooling process in vessel 40 is fed through line 46 to a continuous separator 50, such as a centrifuge or filter. There the crystals preferably are washed with water (or any other appropriate liquid) to eliminate any residual PCE and other contaminants. This wash liquid is supplied to separator 50 through line 52. The sulfur crystals will have purity in excess of 99 percent. They are extracted from the separator through line 54 and are processed in dryer 60 to extract any remaining wash liquid and solvent. The dried sulfur crystals are discharged through line 62 to collection basin 64. A slip stream of the centrate or filtrate (not illustrated) may be removed to purge the process of organic compounds, which stream may be fractionated if desired to recover solvent and to separate entrained organic material.

The centrate or filtrate, along with the wash water from separator 50, is discharged through line 68 to a surge vessel 70. In addition, the solvent recovered from the drying operation in drier 60 may also be supplied to surge vessel 70 through line 74. Makeup PCE solvent is added through line 76 to vessel 70 as required. PCE solvent is supplied through line 14 to vessel 10 by an appropriate pump 78 operated in response to an appropriate sensor in vessel 10.

A typical material balance achieved by the recovery process of the preferred embodiment just described is shown in the table of FIG. 3, which gives the constituents in pounds per hour for the various lines of FIG. 1 for a continuous system.

While PCE alone is a satisfactory organic solvent for the process just described, having a sulfur solubility of over 20 percent at 100 degrees centigrade, the combination of other solvents along with perchlorethylene can increase the solubility significantly. As noted above, these additional compounds include, for example, naphthol, pyridine, quinoline, cyclohexylamine and their isomers and homoloques.

The following examples show the higher solubility which can be achieved with such combined solvents. Where thiosulfates may be present in the sulfur cake, dilute sulfuric acid may be added during the extraction phase to further improve the purity of the sulfur.

EXAMPLE 1

A crude aqueous sulfur cake of the composition shown below is mixed with a solvent containing 60 percent by weight of perchlorethylene and 40 percent by weight of beta-napththol at 125 degrees centigrade and at two atmospheres pressure. The solubility of the sample sulfur in this mixed solvent is 24.22 percent, as compared to a solubility at 100 degrees Centigrade for perchlorethylene of 20.3 percent.

| SULFUR | 46.33% |
|---|---|
| NaHCO$_3$ | 1.14 |
| Na$_2$CO$_3$ | 0.28 |
| Na$_2$S$_2$O$_3$ | 1.06 |
| FeS  FeSO$_4$ | 2.58 |
| Na$_2$SO$_4$ | 3.73 |
| NaSCN | 4.05 |
| H$_2$O | 40.83 |

EXAMPLE 2

A crude aqueous sulfur cake having the composition shown below is mixed with a solvent containing 80 weight percent perchlorethylene and 20 percent pyridine. The solubility of sulfur in this mixture is 36.56 percent at 100 degrees centigrade.

| SULFUR | 45.63% |
|---|---|
| NaHCO$_3$ | 1.54 |
| Na$_2$CO$_3$ | 0.28 |
| Na$_2$S$_2$O$_3$ | 1.06 |
| FeS  FeSO$_4$ | 2.58 |
| Na$_2$SO$_4$ | 3.73 |
| NaSCN | 4.05 |
| H$_2$O | 40.83 |

EXAMPLE 3

The crude aqueous sulfur cake of the composition shown below is mixed with a solvent containing 80 weight percent perchlorethylene and 20 weight percent quinoline at 105 degrees centigrade. The sulfur solubility in this solvent mixture is 36.6 percent.

| SULFUR | 40.16% |
|---|---|
| NaHCO$_3$ | 2.52 |
| Na$_2$CO$_3$ | 0.648 |
| Na$_2$S$_2$O$_3$ | 0.94 |
| FeS  FeSO$_4$ | 3.41 |
| Na$_2$SO$_4$ | 4.26 |
| H$_2$O | 48.063 |

EXAMPLE 4

The crude aqueous sulfur cake of the composition shown below is mixed with a solvent containing 80 weight percent perchlorethylene and 20 weight percent cyclohexylamine. The solubility of sulfur in this solvent at 120 degrees centigrade is 37.6 percent.

| SULFUR | 45.63% |
|---|---|
| NH$_4$HCO$_3$ | 1.58 |
| (NH$_4$)$_2$CO$_3$ | 0.35 |
| Na$_2$SO$_4$ | 3.09 |
| (NH$_4$)$_2$S$_2$O$_3$ | 1.64 |
| FeSO$_4$ | 2.97 |
| H$_2$O | 41.39 |

Where simplicity of operation is of primary significance the presently preferred embodiment is that where perchloroethylene alone is used as the solvent. Where it is necessary to limit the amount of solvent that is required in the practice of the invention then the preferred embodiment is that where amines are added to the perchloroethylene according to these examples, and particularly Example 4.

As a result of being processed by the preferred method of the present invention, purified elemental sulfur crystals are extracted from the aqueous cake without requiring the latent heat necessitated by a phase change, and the resulting sulfur is of commodity-grade and therefore readily marketable.

Thus, the process and apparatus of the present invention eliminate certain deficiencies of the prior art for separating sulfur from an aqueous cake, and in addition achieve, in an economical, energy efficient and environmentally acceptable way, sulfur of a purity sufficient to render it readily marketable.

Although preferred embodiments of the invention have been described, those skilled in the present art will understand that various changes may be made in the preferred process and apparatus while retaining the advantages contemplated by this invention. For that reason, the scope of the invention is not limited to the preferred examples, process and apparatus just described, but rather is set forth in the following claims.

What is claimed is:

1. A process for purifying crude solid phase elemental sulfur in an aqueous cake incorporating a base solvent comprising the steps of:
   selecting an organic solvent for elemental sulfur, said organic solvent being substantially immiscible in the base solvent and being capable of dissolving at least approximately twice as much by weight of elemental sulfur at 100 degrees centigrade as at 20 degrees centigrade, said organic solvent including a water immiscible solvent and a water miscible solvent;
   admixing said base solvent cake with said organic solvent to form an admixture, said admixing being carried out at a temperature below the boiling point of said admixture to dissolve at least a substantial portion of said elemental sulfur in said organic solvent and to form a sulfur-laden solvent;
   allowing said admixture to stand and form a base solvent phase and a sulfur-laden solvent phase;
   separating said base solvent phase from said sulfur-laden solvent phase;
   cooling said sulfur-laden solvent phase to form elemental sulfur crystals and a sulfur saturated organic solvent; and
   separating said sulfur saturated organic solvent from said elemental sulfur crystals to obtain purified sulfur.

2. A process as set forth in claim 1 wherein said process is continuous.

3. A process as set forth in claim 1, including the step of treating said separated base solvent phase to remove inorganic ionic species.

4. A process as set forth in claim 1, including the step of removing solid phase contaminants from said sulfur-laden solvent phase.

5. A process as set forth in claim 1, including the step of recycling said sulfur saturated organic solvent to said admixing step.

6. A process as set forth in claim 1, including the step of washing said elemental sulfur crystals and drying the resultant washed elemental sulfur crystals.

7. A process as set forth in claim 1, including the steps of diverting a slip stream of said sulfur saturated organic solvent from said recycling step, fractionating the slip stream to recover purified organic solvent, and recycling said purified organic solvent to said admixing step.

8. A process as set forth in claim 1 wherein said organic solvent is an admixture of perchloroethylene and an amine.

9. A process as set forth in claim 1 wherein said organic solvent is an admixture of perchloroethylene and pyridine.

10. A process as set forth in claim 1 wherein said organic solvent is an admixture of perchloroethylene and quinoline.

11. A process as set forth in claim 1 wherein said organic solvent is an admixture of perchloroethylene and cyclohexylamine.

12. A process as set forth in claim 1 wherein said water immiscible solvent is selected from the group consisting of xylenes, ethylbenzene, tetrahydronaphthalene, petroleum naptha, trichloroethylene, perchloroethylene, cyclohexane, ethyl cyclohexane, carbon tetrachloride, tetrachloroethane and mixtures thereof.

13. A process as set forth in claim 1 wherein said water miscible solvent is selected from the group consisting of propylamine, amylamine, triaminobenzene, cyclohexylamine, pyridine, quinoline, ethanolamine, ethylenediamine, methylamine, ethylamine, butylamine, diethylamine, dimethylamine, diphenylamine, phenylenediamine, phenylethylamine, aniline, phenylaniline, ethylaniline, butylaniline, methylaniline, toluidine, and mixtures thereof.

* * * * *